United States Patent [19]
Eisele

[11] 4,237,775
[45] Dec. 9, 1980

[54] DIAPHRAGM FOR PRESSURE SENSORS

[75] Inventor: Walter H. Eisele, Malibu, Calif.

[73] Assignee: Gould Inc., Rolling Meadows, Ill.

[21] Appl. No.: 935,180

[22] Filed: Aug. 21, 1978

[51] Int. Cl.³ .......................... F01B 19/00; F16J 3/02; F16J 3/04
[52] U.S. Cl. .......................................... 92/99; 92/34; 92/45; 92/104
[58] Field of Search ................ 92/104, 99, 103 M, 34, 92/45; 73/715, 716, 729

[56] References Cited

U.S. PATENT DOCUMENTS

| | | | |
|---|---|---|---|
| 2,015,374 | 9/1935 | Baker ................................. | 92/104 X |
| 2,650,618 | 9/1953 | Flubacker ............................. | 92/99 |
| 2,671,833 | 3/1954 | Dunmyer et al. .................. | 73/729 X |
| 2,909,364 | 10/1959 | Stedman ............................ | 73/715 X |
| 3,072,150 | 1/1963 | Hastings et al. .................... | 92/104 X |
| 3,079,953 | 3/1963 | Mounteer . | |
| 3,802,267 | 4/1974 | Lofink . | |
| 3,875,802 | 4/1975 | Garnett et al. ..................... | 92/104 X |

FOREIGN PATENT DOCUMENTS 576839 5/1933 Fed. Rep. of Germany ............. 92/104

*Primary Examiner*—Irwin C. Cohen
*Attorney, Agent, or Firm*—Russell E. Baumann

[57] ABSTRACT

A diaphragm consisting of multiple arches configured such that radial compliance is increased and pressure responsive radial compression loading will approximate radial tension loading resulting from deflection of an associated pressure sensor mechanism. On the pressure receiving side of the diaphragm, a broad shallow convex section extends between two concave sections of tighter curvature. The portions of the concave sections remote from the convex section each extend to a substantially cylindrical configuration. A sharp convex bend extending to a flat radial flange provides an attachment edge with minimum attachment stress. A method of forming such a diaphragm to insure uniform wall thickness by allowing maximum lateral migration of the diaphragm sheet is also disclosed.

8 Claims, 9 Drawing Figures

DIAPHRAGM FOR PRESSURE SENSORS

BACKGROUND OF THE INVENTION

The present invention relates to diaphragms for pressure sensors and the method of forming same.

Various configurations of diaphragms have been used in a wide variety of pressure sensor devices with the primary object of these diaphragms being to seal the inside of the device from the surrounding environment while allowing the force collector to move in response to the measured pressure. To this end, metal sheet-like elements generally of circular configuration have been used. The contour of such diaphragms is also generally symmetrical about a central axis with concentric, convex and concave deformations in the sheet. The deformations act to reduce the force required to bend the diaphragm in response to movement of the central force collecting piston of the pressure sensor. The deformations also are intended to relieve radial stress in the diaphragm as the force collecting piston moves axially under pressure load.

The resistance which is encountered with such diaphragms is generally non-linear. This is in part because the radial strain experienced by such diaphragms is related to the axial movement of the force collecting piston by the approximated relationship that the elongated radial width of the active portion of the diaphragm is equal to the square root of the sum of the squares of the relaxed radial width of the active portion of the diaphragm and the axial displacement of the force collecting piston. Such a non-linear relationship affecting the performance of the diaphragm results in a non-linear response of the sensor to pressure. Calibration of the instrument over its operating range.

Another difficulty encountered by thin metal diaphragms is stress concentration at both the annular mounting rim of the sensor and the force collecting piston. Diaphragm failure is frequently experienced at these points rather than at some intermediate point therebetween. The abrupt change from the flexible unsupported portion of the diaphragm to the rigid components of the sensor is primarily responsible for these problems.

In attempting to overcome the foregoing difficulties, i.e., a non-linear spring rate of the diaphragm and high stress loadings at the attachment points, various configurations have previously been employed. However, efforts at solving these problems have generally resulted in an improvement in diaphragm performance with respect to one consideration at the expense of the other consideration. Consequently, no real solution to the improvement of overall diaphragm performance has heretofore been found.

SUMMARY OF THE INVENTION

The present invention is directed to improved diaphragm configurations for pressure sensors and the methods of forming same. Through the present invention, the non-linear radial resistance of a diaphragm can be greatly reduced as well as the high stress concentrations at the attachment points. The special configuration of the present invention can be advantageously formed through a two-step process without undue stretching of the diaphragm material.

To accomplish the substantial reduction in non-linear radial resistance of the diaphragm, a specific radial profile has been developed which includes, as viewed from the pressure receiving side of the diaphragm, a broad, convex section associated at the inner and outer edges thereof with concave sections having smaller radii of curvature than the broad, convex portion. The concave sections extend away from the convex section to portions which approach a perpendicular orientation relative to the plane of the diaphragm. This orientation may be characterized as creating substantially cylindrical portions.

From the foregoing configuration, two effects are obtained. First, the broad, convex portion will tend to flatten out with increasing pressure. This results in compression loading on the concave sections. As pressure increases and as the center convex section tends to flattens out, the force collecting piston of the transducer moves axially. This axial movement results in a radial tension loading of the diaphragm. Through empirical analysis, diaphragms can be developed using the present configuration which tend to offset the compression loading of the convex portion with the tension loading caused by the axial movement of the force collecting piston. The concave sections add significantly to the reduction in flexure rigidity of the diaphragm and provide little resistance to the flattening of the center convex section. Also the broad, convex section provides increased radial compliance irrespective of its pressure responsive characteristic as compared to the sinesoidal convolutions of conventional diaphragms. Thus, the non-linear resistance to the required radial extension of the diaphragm can be substantially overcome.

Second, stresses at the attachment points of the diaphragm are also reduced by the configuration of the present invention. As stated above, the concave sections of the diaphragm extend upwardly to substantially cylindrical portions. Once having approached such a cylindrical configuration, a bend may be formed in the diaphragm which is preferably about a minimum radius of curvature for the material of the diaphragm. From this bend on each edge of the diaphragm, a radially extending flange is provided. The flange provides an area for attachment of the diaphragm to the pressure sensor. Finally, the diaphragm is welded or otherwise fixed to the pressure sensor at the flanges of the diaphragm as closely as possible to the sharp bends of the diaphragm. Alternately, the diaphragm may be directly welded to the pressure sensor where the concave sections approach a substantially cylindrical configuration. The substantially cylindrical configuration provides great rigidity to the diaphragm at that location. The rigidity is such that it overcomes any stress concentration which might otherwise be transmitted to the attachment area. Instead, the other portions of the diaphragm between the generally cylindrical portions will take the strain. Naturally, the sharp bend also provides added rigidity to the flange and attachment points.

In order to form the sharp bend and maintain a relatively uniform wall thickness, across the width of the diaphragm a method has been developed by the present invention which avoids formation of the sharp bend during formation of the convex and concave annular sections. During the formation of these sections, the annular sheet of metal being formed into the diaphragm tends to migrate radially inwardly from the outer edge and radially outwardly from the inner edge in defining the annular rings. If the sharp bend is to be formed in the same process, the dies tend to hold onto both the inner and outer edges of the annular sheet. Under such circumstances, the center portions of the sheet may tend to stretch excessively, leading to a non-uniform wall thickness of the resulting diaphragm. By the present invention, the sharp bends formed at the inner and outer edges of the diaphragm are completed by a second forming step.

Accordingly, it is an object of the present invention to provide an improved diaphragm for pressure sensing devices.

It is another object of the present invention to provide a diaphragm for pressure sensors having minimum resistance to the operation of the sensor.

It is yet another object of the present invention to provide a diaphragm for pressure sensors having low stress concentrations at the attachment points of the diaphragm.

It is yet another object of the present invention to provide an improved method for forming diaphragms of the present invention.

Other and further objects and advantages will appear hereinafter.

DETAILED DESCRIPTION OF THE PREFERRED EMBODIMENT

Figure 1:
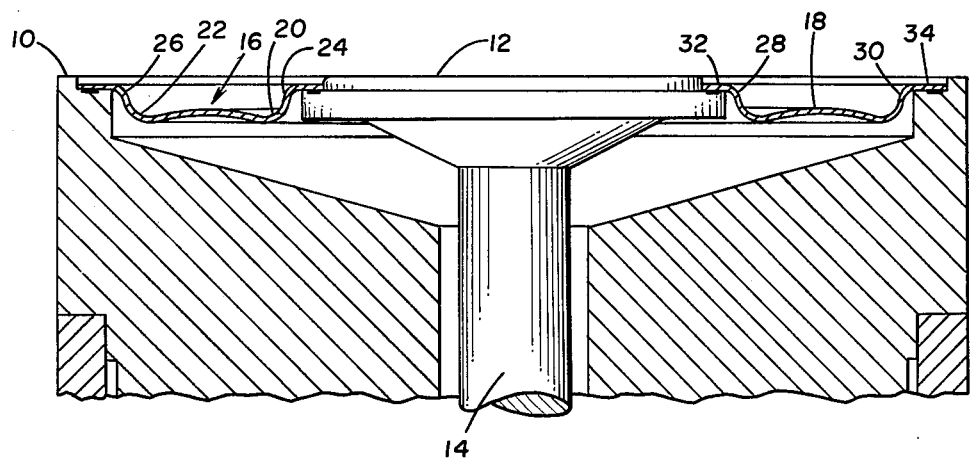
FIG. 1 is a cross-sectional elevation of a diaphragm of the present invention shown in place in a pressure sensor.
Figure 2:
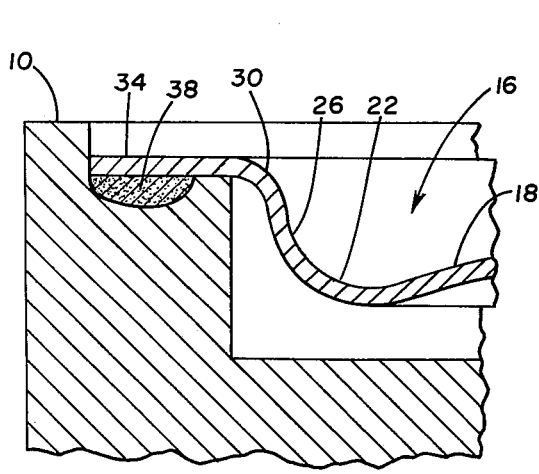
FIG. 2 is a cross-sectional elevation of a detail of the pressure sensor of FIG. 1.

Turning in detail to the drawings and in particular the embodiment illustrated in FIGS. 1 and 2, a portion of a pressure sensor is disclosed. The term "pressure sensor" as used herein is any device which is responsive to pressure by having the sensed pressure operate to deflect a piston resistive to such deflection from its rest position. As illustrated, the pressure sensor may have an annular rim 10 for attachment to the outer edge of a diaphragm. The rim may or may not have a step in the upper surface thereof to insure proper placement of the diaphragm on the rim. A force collecting piston 12 is shown to be concentrically mounted relative to the annular rim 10 at approximately the same level. A shaft 14 extends to the recording portion of the sensor.

A diaphragm, generally designated 16, is shown here to be annular in overall plan. As may be preferred in some applications, the diaphragm may not have a central hole therethrough. The presence or absence of a central hole in the diaphragm is of little consequence to the overall operation of the annular portion or element which constitutes the active part of the diaphragm.

The operation of the pressure sensor requires that the piston 12 move downwardly in response to increased pressure on the outside of the sensor. Resistance to movement of the piston 12 is usually provided by a spring or other mechanism which exhibits a substantially constant ratio between displacement and resisting force. In other words, the resistance provided by the sensor itself generally is designed to exhibit a fixed spring constant. At the same time, the diaphragm is designed to provide as little resistance to movement of the piston 12 as possible. Diaphragms are also generally designed to experience a minimum amount of sag between their inner and outer support. For convenience the convexity and concavity of the diaphragm will be defined here in terms of the surface which is on the pressure side of the diaphragm. Naturally, as the diaphragm is of generally uniform thickness, these features will be reversed on the sensor side of the diaphragm.

The diaphragm of the preferred embodiment as seen in FIG. 1 incorporating the present invention employs a broad, relatively shallow, convex span 18 forming a central annular section. Radially in either direction from convex span 18 are shorter, deeper, concave spans 20 and 22. The annular concave spans 20 and 22 continue to substantially cylindrical portions 24 and 26. In the preferred embodiment of FIG. 1, a sharp, convex bend 28 and 30 extends from each substantially cylindrical portion 24 and 26 respectively. The sharp, convex bends 28 and 30 are preferably about a minimum radius for the material employed as the diaphragm. Lastly, attachment flanges 32 and 34 extend from the sharp, convex bends 28 and 30 in radial directions for association with the piston 12 and the annular rim 10 of the pressure sensor. In the alternate embodiment of FIG. 3, attachment is made to the inner surface of the annular rim 10; and therefore, the sharp, convex bends 28 and 30 and the attachment flanges 32 and 34 become unnecessary.

To achieve a minimum effect of the diaphragm on the overall resistance to movement of the force collecting piston 12, counter-balancing mechanisms have been designed into the diaphragm of the present invention. To this end, an effort has been made to minimize the resistance to radial extension of the diaphragm required as the force collecting piston 12 moves axially and hence away from the annular rim 10. Secondly, the diaphragm of the present invention has been designed to itself respond to the accumulated pressure on the pressure side of the sensor. This pressure response of the diaphragm causes radial expansion of the diaphragm to keep up with the required elongation as the central force collecting piston 12 moves under the accumulated pressure. The concave sections 20 and 22 minimize bending stresses by providing an extended length over which bending strains may occur; and the convex section exhibits substantial radial compliance. Thus, these sections provide maximum flexibility of the diaphragm in the required directions. The central, convex span 18 is relatively broad and shallow in order that it will respond to pressure on the pressure side of the sensor. As pressure is increased on the diaphragm, the convex span 18 will tend to flatten. This flattening of the span 18 will result in radial compression loading or outward movement of the concave spans 20 and 22. At the same time, as pressure increases on the sensor, the piston 12 will tend to move axially. This movement will require a radial elongation of the diaphragm 16. Thus, convex span 18 will act to meet that requirement by itself being flattened by the pressure. The concave sections minimize the bending required in accommodating both the extension of the diaphragm and the flattening of the convex portion thereof.

Neither the flattening of the convex portion of the diaphragm nor the overall radial extension of the diaphragm are linear functions. Consequently, the considerations necessary in calculating the appropriate dimensions for such a diaphragm become prohibitively complicated. Through empirical testing, appropriate relationships can be found for any given diaphragm size normally associated with such pressure sensors. Tests have demonstrated that certain approximate relationships can be employed as a basis from which to start empirically fine tuning the design of a diaphragm to fully realize the advantages of the present invention. The diaphragms which have been tested are of the type suitable for use in sensors where eighty to ninety percent of the systems stiffness is in a force gaging device such as a strain gage equipped cantilever beam. Only ten to twenty percent of the stiffness is in the diaphragm.

Figure 4:
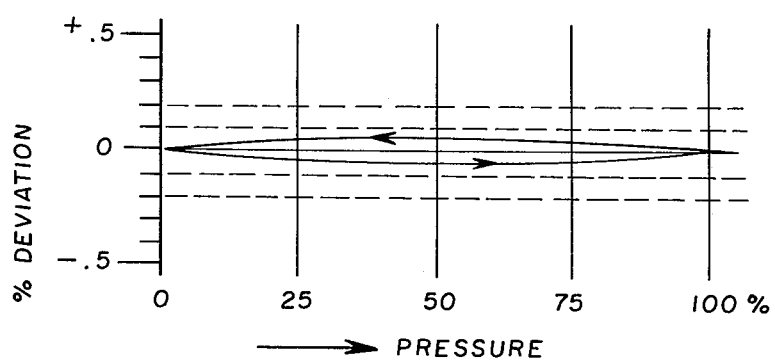
FIG. 4 is a graph showing the percent deviation in resistance force of the diaphragm with increasing pressure.

In describing such relationships, certain definitions are necessary. The active span of the diaphragm of the preferred embodiment is the distance between the two cylindrical portions 24 and 26. It is within this area that substantially all of the diaphragm flexure occurs. Through empirical methods, a first approximate radius of curvature of the two concave sections 20 and 22 has been found to be around one eighth of the active span length. A first approximate radius of curvature of the convex span 18 has been found to be acceptable when approximately equal to the active span length. When property matched and empirically tuned, a response curve of the overall sensor may be arrived at such as shown in FIG. 4. In FIG. 4, the deviation of the spring constant from its constant value is shown across the full range of pressure for the pressure sensor. Naturally, hysteresis inevitably affects the performance of such a device but the device may be adjusted to give zero deviation at zero pressure and maximum pressure as shown.

Figure 3:
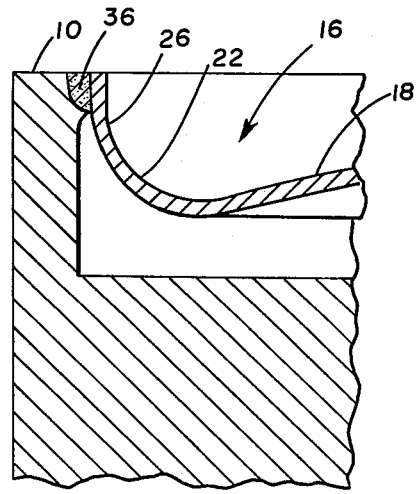
FIG. 3 is a cross-sectional elevation of a second embodiment of the diaphragm showing attachment to the pressure sensor.

To eliminate concentration of bending stresses at the attachment points of the diaphragm, the concave portions 20 and 22 extend up to substantially cylindrical portions 24 and 26. These portions 24 and 26 act to resist bending and radial stresses and thus do not transmit such stresses through to the attachment points of the diaphragm. In the case of the embodiment as shown in FIG. 3, this effect of the cylindrical portion is used exclusively to reduce bending load on both the diaphragm adjacent the attachment point and the bond itself. In FIG. 3, the diaphragm is shown to be welded to the inside of the annular rim 10 at 36.

In FIG. 2, the cylindrical portions 24 and 26 are employed with the sharp, convex bends 28 and 30 and the radial attachment flanges 32 and 34 to provide rigid resistance to transmission of bending stresses directly to the attachment location. It is also advantageous that the attachment point shown as weld 38 is as close as practical to the inner edge of the rim 10. This prevents any cantilevering effect of the diaphragm at the inner corner of the rim 10. Resistance to bending is maximized in the sharp, convex bend 28 and 30 of the diaphragm by having the radius of curvature approach the minimum possible for the diaphragm material and thickness used.

As the thickness of such diaphragms generally ranges from 0.0015 to 0.0110 inches, the radius of this sharp bend may preferably range from 0.003 inches to 0.010 inches. Through the use of the concave sections 20 and 22 with the cylindrical portions 24 and 26 and the sharp bends 28 and 30, maximum compliance is obtained with minimum stress concentration. As a result, the pressure responsive characteristic of the convex span 18 may be allowed to operate as freely as possible to accommodate the necessary radial extension of the diaphragm under loading.

Figure 5:
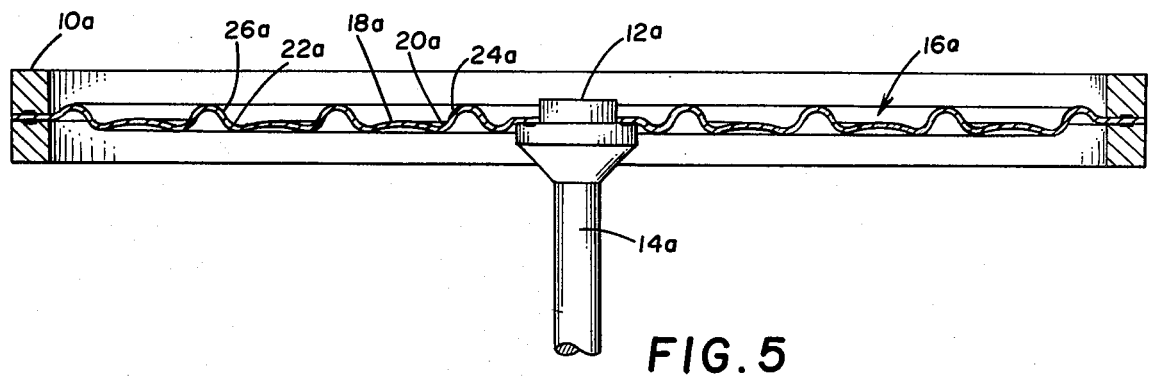
FIG. 5 is another embodiment of a diaphragm of the present invention shown in cross-sectional elevation.

As a variation on the present embodiment, a plurality of diaphragm elements are disclosed in FIG. 5. It can be seen from FIG. 5 that a plurality of complete elements having the concave sections 20a and 22a and the convex section 18a may be used to arrive at the same result as the single element shown in FIG. 1. The diaphragm 16a of FIG. 5 is shown to be positioned between annular rim 10a and force collecting piston 12a.

Figure 6:
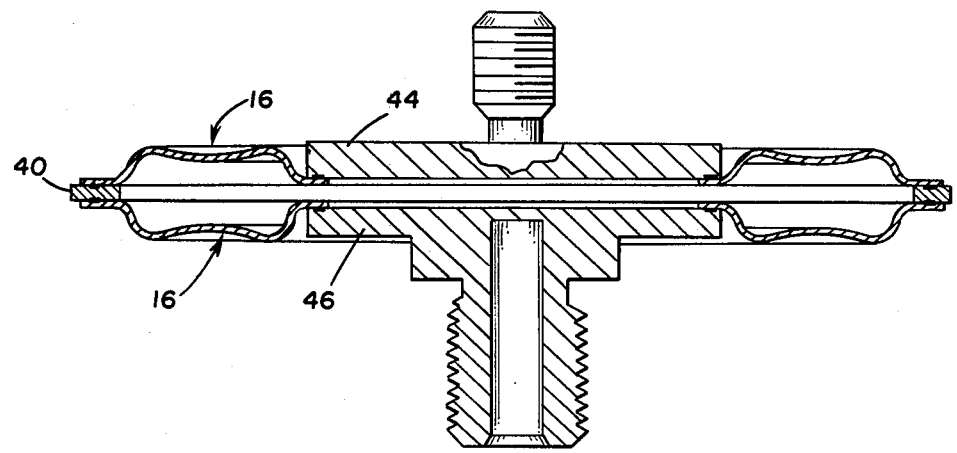
FIG. 6 is a second application shown in cross-sectional elevation of the diaphragm of FIG. 1.
Figure 7:
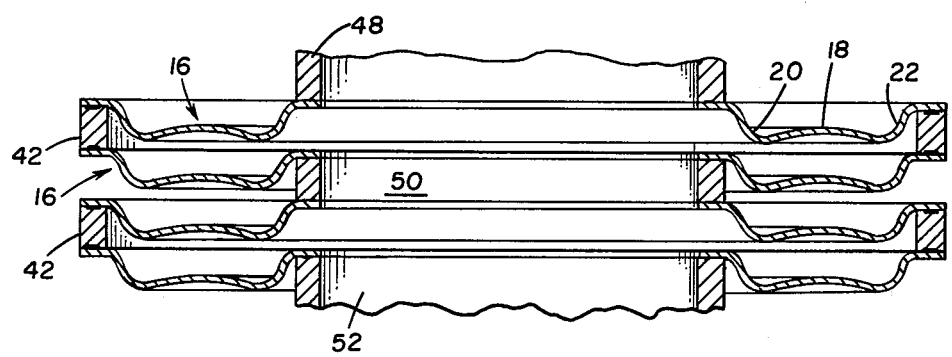
FIG. 7 is a third application shown in cross-sectional elevation of the diaphragm of FIG. 1.

Two uses for the diaphragm as illustrated in FIG. 1 are shown in FIGS. 6 and 7. In each of these Figures, diaphragms are placed in series to accomplish greater axial flexibility of the instrument. As both the outer rims 40 and 42 and the inner elements 44 through 52 do not expand or contract radially, the same compensating effect of the flattening of the central convex span 18 is required. It should be noted that not all of the diaphragms in FIG. 7 are oriented to have the convex section face the pressure input. Instead, the system is balanced to provide two in each direction, making the device reversible with maximum compliance provided by the present diaphragm configuration.

Figure 8:
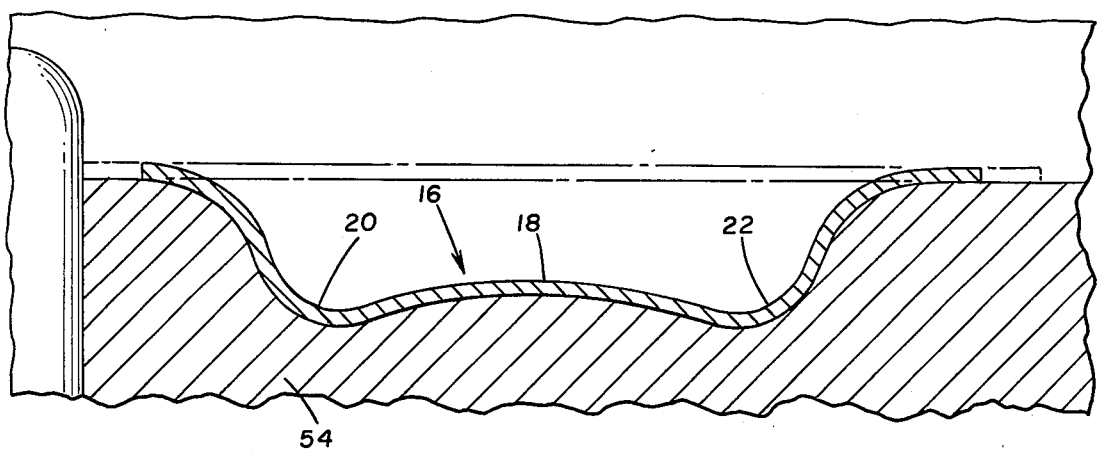
FIG. 8 is a cross-sectional elevation of a die used in the first step of forming a diaphragm of the present invention.
Figure 9:
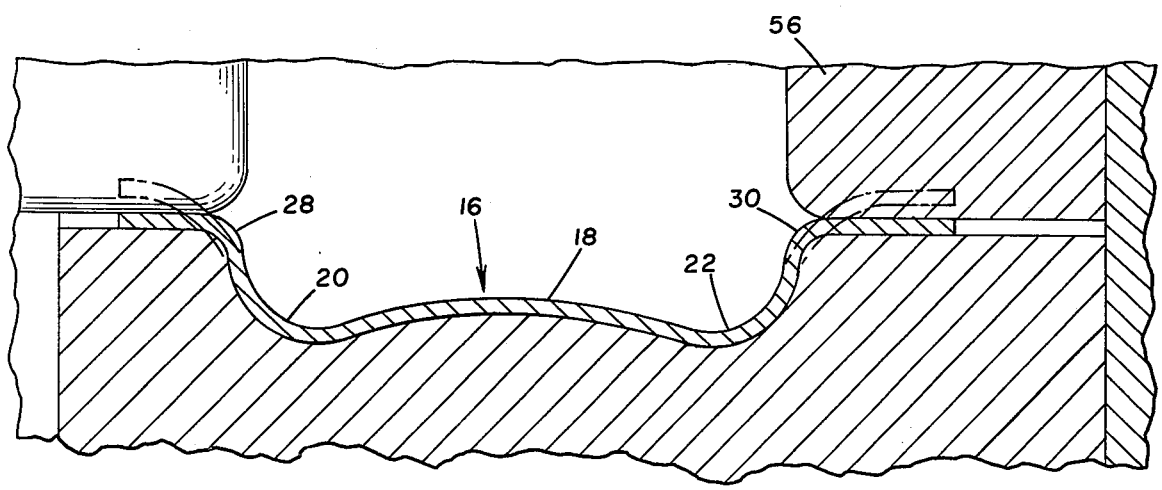
FIG. 9 is a die used in the second step of forming a diaphragm of the present invention.

FIGS. 8 and 9 show the manufacture of a diaphragm of the present invention. In FIG. 8, a first die is employed to define the complete profile of the diaphragm inside of the two sharp, convex bends which exist at the inner and outer edges of the diaphragm when completed. A more moderate bend is made. Shown in phantom in FIG. 8 is the original sheet prior to forming. As can be seen, substantial migration of the metal occurs in both radial directions with the formation of the central portion of the diaphragm.

In FIG. 9, a second die 56 is shown which is used to simply form the outer, sharp convex bends 28 and 30 once migration of the sheet material into the central portion of the die is no longer a consideration. This two step procedure has been found to make more uniform the overall thickness and construction of the diaphragm when complete.

Thus, a diaphragm and method of making same are disclosed herein which have the ability to provide a minimum effect on the spring constant of the pressure sensor, reduce bending stresses at the attachment points of the diaphragm and make more uniform the overall diaphragm construction. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. An annular diaphragm element for a pressure sensor, comprising
   a first sheetlike diaphragm member having a pressure receiving side, said pressure receiving side having a first annular concave section which extends inwardly to form a first substantially cylindrical portion, a first annular convex section radially outwardly of said first annular concave section and extending directly therefrom and a second annular concave section radially outwardly of said first annular convex section and extending directly therefrom which extends outwardly to form a second substantially cylindrical portion, said first annular convex section having a sufficiently shallower curvature and a sufficiently wider span than each of said first and second annular concave sections such that radial compression loading from flattening of said first annular convex section is substantially equal to radial tension loading from pressure responsive deflection of the pressure sensor when said diaphragm member is subjected to pressure loading of said pressure receiving side.

2. The annular diaphragm element of any one of claims 1, or 7 wherein said pressure receiving side further has a first annular, sharply convex section radially inwardly of said first annular concave section and a second annular, sharply convex section radially outwardly of said second annular concave section.

3. The annular diaphragm element of claim 2 further comprising at least a second sheet like diaphragm member being identical and smaller than said first sheet like diaphragm member, being radially inwardly thereof and being integral therewith.

4. The annular diaphragm element of claim 2 wherein said first annular, sharply convex section extends inwardly to form a first flat sensor attachment flange and said second annular sharply convex section extends outwardly to form a second flat transducer flange.

5. The annular diaphragm element of claim 1 wherein the radius of curvature of said first annular convex section is about eight times the radius of curvature of each of said first and second annular concave sections.

6. The annular diaphragm element of claim 1 wherein the distance between said first and second substantially cylindrical portions is about the same as the radius of curvature of said first annular convex section.

7. An annular diaphragm element for a pressure sensor, comprising a first sheet like diaphragm member having a pressure receiving side, said pressure receiving side having a first annular concave section, a first annular convex section radially outwardly of said first annular concave section and a second annular concave section radially outwardly of said first annular convex section, said first annular convex section having a shallower curvature and a wider span than each of said first and second annular concave sections, the radius of curvature of said first annular convex section being about eight times the radius of curvature of each of said first and said second annular concave sections and the distance between the inner extremity of said first annular concave section and the outer extremity of said second annular concave section being about equal to the radius of curvature of said first annular convex section such that radial compression loading from flattening of said first annular convex section is substantially equal to radial tension loading from pressure responsive deflection of the pressure sensor when said diaphragm member is subjected to pressure loading of said pressure receiving side.

8. An annular diaphragm assembly of a pressure sensor, comprising a circular support rim, a concentric disc and a first sheet like diaphragm member having a pressure receiving side, said pressure receiving side having a first annular concave section extending inwardly to form a first substantially cylindrical portion, a second annular concave section radially outwardly and spaced from said first annular concave section extending outwardly to form a second substantially cylindrical portion, an intermedite section extending between said first and said second annular concave sections, said intermediate section defining a first annular convex section directly connected to said first and second annular concave sections, said first annular convex section having a sufficiently shallower curvature and a sufficiently wider span than each of said first and second annular concave sections, a first annular, sharply convex section radially inwardly of said first annular concave section at said first substantially cylindrical portion thereof, a second annular, sharply convex section radially outwardly of said second annular concave section at said second substantially cylindrical portion thereof, a first flat sensor attachment flange extending inwardly from said first annular, sharply convex section, said first flat sensor attachment flange being attached to said disc immediately adjacent the peripheral edge thereof, a second flat sensor attachment flange extending outwardly from said second annular, sharply convex section, said second flat sensor attachment flange being attached to said rim immediately adjacent the inner end thereof.

* * * * *